US009610694B2

(12) United States Patent
Duval et al.

(10) Patent No.: US 9,610,694 B2
(45) Date of Patent: Apr. 4, 2017

(54) DEVICE FOR HANDLING OBJECTS IN A GLOVE BOX

(71) Applicant: Areva NC, Paris (FR)

(72) Inventors: Patrice Duval, Villeneuve Les Avignon (FR); Jean-Jacques Marchal, Lieuran-cabrieres (FR); Luc Collette, Pont-saint-esprit (FR)

(73) Assignee: AREVA NC, Courbevoie (CH)

( * ) Notice: Subject to any disclaimer, the term of this patent is extended or adjusted under 35 U.S.C. 154(b) by 317 days.

(21) Appl. No.: 14/366,821

(22) PCT Filed: Dec. 21, 2012

(86) PCT No.: PCT/EP2012/076806
§ 371 (c)(1),
(2) Date: Jun. 19, 2014

(87) PCT Pub. No.: WO2013/093076
PCT Pub. Date: Jun. 27, 2013

(65) Prior Publication Data
US 2014/0369790 A1    Dec. 18, 2014

(30) Foreign Application Priority Data

Dec. 22, 2011  (FR) .................................... 11 62293

(51) Int. Cl.
*B25J 21/02* (2006.01)
*B25J 9/02* (2006.01)
(Continued)

(52) U.S. Cl.
CPC ............... *B25J 21/02* (2013.01); *B25J 9/023* (2013.01); *B25J 9/1035* (2013.01); *G21F 7/04* (2013.01)

(58) Field of Classification Search
CPC ........... B25J 21/02; B25J 9/023; B25J 9/1035
See application file for complete search history.

(56) References Cited

U.S. PATENT DOCUMENTS 4,569,623 A   2/1986  Goldmann
4,909,544 A   3/1990  Noe
(Continued)

FOREIGN PATENT DOCUMENTS

CN       1195602 A    10/1998
CN     101432824 A     5/2009
(Continued)

OTHER PUBLICATIONS

French Search Report issued in Application No. FR 11 62293 dated Sep. 19, 2012.
(Continued)

*Primary Examiner* — Jonathan Snelting
(74) *Attorney, Agent, or Firm* — Pearne & Gordon LLP

(57) ABSTRACT

Device for handling objects in a glove box comprising a carriage (2) to support the objects to be handled, a base (6) relative to which the carriage (2) can be moved along a horizontal axis (X), means of driving the carriage (2) along the first axis (X), these drive means comprising an electric motor (14) arranged such that its drive shaft is orthogonal to the axis (X) and projects opposite the base (6), a transmission shaft (18) parallel to the motor (14), a rack (22) fixed to the base (6) along the axis (X) and a pinion (24) directly fixed in rotation to the transmission shaft (18) and engaging with the rack (22), a transmission belt (20) mechanically connecting the drive shaft of the motor (14) to the transmission shaft (18), the electric motor (14) being declutchable and the carriage possibly being moved manually along the axis (X).

17 Claims, 2 Drawing Sheets

(51) Int. Cl.
*G21F 7/04* (2006.01)
*B25J 9/10* (2006.01)

(56) References Cited

U.S. PATENT DOCUMENTS

| | | | |
|---|---|---|---|
| 5,219,215 A | 6/1993 | Akagawa et al. | |
| 6,024,482 A | 2/2000 | Heyraud | |
| 7,476,072 B2 * | 1/2009 | Tamura | B25J 9/023 269/55 |
| 8,576,973 B2 | 11/2013 | Fantini | |
| 2005/0196263 A1 | 9/2005 | Tamura | |
| 2010/0038377 A1 | 2/2010 | Pages | |
| 2010/0258770 A1 * | 10/2010 | Nishitsuji | G01B 11/24 254/98 |
| 2010/0259138 A1 | 10/2010 | Zhang | |
| 2011/0232111 A1 | 9/2011 | Duval | |
| 2012/0090728 A1 | 4/2012 | Duval | |
| 2012/0301253 A1 * | 11/2012 | Hessbrueggen | B23Q 7/047 414/225.01 |
| 2012/0305647 A1 | 12/2012 | Lantheaume | |

FOREIGN PATENT DOCUMENTS

| | | |
|---|---|---|
| CN | 102016722 A | 4/2011 |
| EP | 0 390 483 A2 | 10/1990 |
| FR | 2 505 718 A1 | 11/1982 |
| FR | 2 574 385 A | 6/1986 |
| FR | 2 617 817 A1 | 1/1989 |
| FR | 2 743 005 A1 | 7/1997 |
| FR | 2 845 371 A1 | 4/2004 |
| FR | 2 911 128 A1 | 7/2008 |
| FR | 2 937 027 A1 | 4/2010 |
| JP | S57-093628 U | 6/1982 |
| JP | S61-131893 A | 6/1986 |
| JP | S61-166786 U | 10/1986 |
| JP | H08-112787 A | 5/1996 |
| JP | H09-85651 A | 3/1997 |
| JP | H10-202565 A | 8/1998 |
| JP | H11-163086 A | 6/1999 |
| JP | 2000-237607 A | 9/2000 |
| RU | 105853 U1 | 6/2011 |

OTHER PUBLICATIONS

U.S. Appl. No. 14/402,484, "Storage Device" filed Nov. 20, 2014.
U.S. Appl. No. 14/414,238, "Device for Handling Cases Containing Objects" filed Jan. 12, 2015.
International Search Report for PCT/EP2012/076806 dated Jan. 31, 2013.
Written Opinion for PCT/EP2012/076806.
Office Action issued in corresponding Chinese Patent Application No. 201280069852.5 dated Mar. 25, 2015.
Russian Notice of Allowance issued in Russian Patent Application RU 2014130097 dated Dec. 16, 2016.
Japanese Office Action issued in Patent Application No. JP 2014-548096 dated Nov. 22, 2016.

* cited by examiner

DEVICE FOR HANDLING OBJECTS IN A GLOVE BOX

TECHNICAL DOMAIN AND PRIOR ART

This invention relates to a device for handling objects in a glove box, and more particularly handling of boxes in a glove box in an installation for manufacturing nuclear fuel, for example boxes full of plutonium.

Fabrication of nuclear fuel requires the use of glove boxes inside which equipment for handling materials for use in the fabrication of nuclear fuels and equipment for the fabrication of nuclear fuel, for example in the form of pellets, is confined.

In the case of fabrication of MOX fuel, fabrication uses plutonium oxide, uranium oxide and chamotte.

Plutonium originates particularly from reprocessing of spent nuclear fuel assemblies; plutonium is stored in sealed boxes that are then routed to the workshop or the nuclear fuel fabrication plant.

A handling device confined in a glove box is provided to handle these boxes, capable of displacement along a vertical axis and along a horizontal axis of the box at the same time. This handling device transports the box as far as an emptying wheel to empty the box, particularly after retrieving it when it is released from acase.

This handling device comprises a carriage provided with a basket to hold the box of plutonium oxide. This carriage is free to move horizontally on rails and vertically. The horizontal displacement is controlled by an electric motor and a rack/pinion type system, the pinion being directly fixed in rotation to the motor drive shaft. Similarly, an electric motor is provided for displacement of the carriage along the vertical axis. The shafts of the electric motors project downwards, particularly for the motor for horizontal displacement of the carriage. This directly carries the pinion that engages with the rack. The number of required parts is thus reduced.

As described above, this device is confined in a glove box that, in the case of handling of plutonium oxide boxes, is in a highly irradiating zone. If the handling device should fail, there is obviously no question that an operator can penetrate into the glove box because any maintenance operation must be carried out using gloves and glove ports fixed to the walls of the glove box. Consequently, any maintenance operation may be long and tedious if the device was not designed so that it can be easily removed from the outside of the glove box. Furthermore, in the case of an electric motor failure or a power supply failure, it is desirable to be able to continue to move the carriages vertically and/or horizontally either so that the operation can be terminated, or the plutonium box can be retrieved.

The structure of the handling device as described above cannot enable a manual return of the carriage into the initial position because the horizontal displacement motor is directly fixed in rotation to the pinion of the rack and pinion system. Furthermore, disassembly of the motors is relatively difficult since the motors are located at the bottom of the handling device in a zone that is difficult to access.

PRESENTATION OF THE INVENTION

Consequently, the purpose of this invention is to disclose a device for handling objects in confined spaces with a structure that facilitates maintenance and enables manual movement of objects, for example in case of a failure.

The purpose described above is achieved by a handling device comprising a carriage that can be moved at least horizontally on rails, this carriage comprising a basket in which an object can be placed, for example a box of plutonium oxide, an electric motor, a rack/pinion assembly, the pinion being driven in rotation by the electric motor, the electric motor being oriented so that its shaft is arranged vertically and projects upwards from the device, in the opposite direction to the rack/pinion assembly, the drive generated by the electric motor being transmitted by means of a transmission shaft extending parallel to the spindle of the electric motor between the top part of the device and the bottom part of the device at which the rack/pinion assembly is located, the motor shaft and the transmission shaft being connected by a transmission means, declutching means also being provided to enable manual handling of the rack/pinion assembly through the transmission shaft.

In other words, the electric motor is no longer directly fixed in rotation to the rack/pinion so that the carriage can be handled manually and moreover, the arrangement of the motor in the upper part makes it easy to remove it in the case of a failure of the motor and the manual control is easily accessible from the top. This device comprises more elements than the handling device according to the state of the art; however, it enables easy maintenance and a very large time saving.

The device according to the state of the art was also statically indeterminate, particularly because the electric motor was directly fixed in rotation to the pinion which could cause hard points and create problems in detecting failures. From now on, with the device according to this invention, this static indeterminism is eliminated and a failure can be detected more quickly.

Very advantageously, the carriage can also be moved along a vertical axis by means of an electric motor; this motor is preferably arranged parallel to the horizontal displacement motor, its drive shaft projecting upwards from the device in a manner similar to the horizontal displacement shaft.

This motor is also fitted with a declutching system so that the carriage can be handled manually to adjust its vertical position.

Very advantageously, the different elements are mounted by means of keyhole devices enabling the use of captive screws, which facilitates assembly and disassembly of the different elements with a single hand to facilitate maintenance.

The subject-matter of this invention is then a device for handling objects in a glove box comprising a carriage to support the objects to be handled, a base relative to which the carriage can be moved along a first axis, a chassis that can also be moved along the first axis, means of driving the carriage along the first axis, said drive means comprising a first electric motor fixed to the chassis such that its drive shaft is orthogonal to the first axis and projects opposite from the base, a transmission shaft fixed to the chassis parallel to the first motor, means of transmitting rotation of the drive shaft to the transmission shaft, a rack fixed onto the base along the first axis, and a pinion directly fixed in rotation to the transmission shaft and engaging with the rack, the displacement means along the first axis also comprising declutching means between the first motor and the transmission shaft and manual control means to enable displacement of the carriage along the first axis without using the first electric motor.

Means of transmitting the rotation of the drive shaft from the first electric motor to the transmission shaft advantageously consist of a transmission belt.

For example, the declutching means comprise a declutching pulley and retractable means for fixing it in rotation with a drive pulley fixed in rotation to the drive shaft of the first electric motor, the belt connecting the declutching pulley and the transmission shaft, said declutching pulley including a crank handle to drive it in rotation when it is no longer fixed to the drive pulley.

Advantageously, the carriage can be displaced along a second axis and in which said device comprises means of displacing the carriage along the second axis, said displacement means comprising a second electric motor fixed onto the chassis such that its drive shaft is orthogonal to the first axis and projects opposite the base, conversion means for converting rotation of the electric motor into a translation movement of the carriage along the second axis, means of transmitting rotation of the drive shaft from the second electric motor to the conversion means, said displacement means along the second axis also comprising declutching means between the second motor and the conversion means and manual control means of said conversion means.

Preferably, the conversion means consist of a ball screw.

The means of transmitting rotation of the drive shaft from the second electric motor to the conversion means advantageously consist of a transmission belt.

For example, the declutching means comprise a declutching pulley and retractable means to fix it in rotation to a drive pulley engaged with the drive shaft of the second electric motor, the belt connecting the declutching pulley and the ball screw, said declutching pulley comprising a crank handle to rotate it when it is no longer fixed to the drive pulley.

The device may comprise at least one column to guide displacement of the carriage along the second axis.

Preferably, the first axis is horizontal and the second axis is vertical.

The base advantageously comprises guide rails along the first axis, the carriage comprising guide rollers cooperating with said rails.

In one example embodiment, the chassis may be approximately plane in shape oriented vertically, and the first electric motor is suspended from a bracket fixed onto a side face of the chassis.

The transmission shaft is advantageously mounted by means of two bearing on one side face of the chassis opposite the face from which the first electric motor is suspended, said bearing being fixed removably on the chassis.

The second electric motor may be suspended from a bracket fixed on a side face of the chassis.

Preferably, the ball screw and the guide columns are mounted on the same lateral face of the chassis as the face on which the transmission shaft is mounted.

The carriage advantageously comprises at least one basket in which a box will be placed, said basket comprising two sidewalls facing each other and delimiting a housing suitable to contain the box, said housing comprising at least one lateral opening and a bottom in which a recess is formed, each of the sidewalls comprising a horizontal support that will support the box vertically.

The box may be cylindrical with a circular cross-section, the sidewalls will then have a section in the form of an arc of a circle so as to delimit a housing with an inside diameter corresponding to the outside diameter of the box.

The device may comprise an elevating means designed to put the box into place in the basket, the elevator comprising a telescopic shaft along a vertical direction and a support fixed to the shaft with a shape complementary to the shape of the recess in the bottom of the basket.

BRIEF DESCRIPTION OF THE DRAWINGS

This invention will be better understood after reading the following description and the appended drawings in which.

DETAILED PRESENTATION OF PARTICULAR EMBODIMENTS

Figure 1:
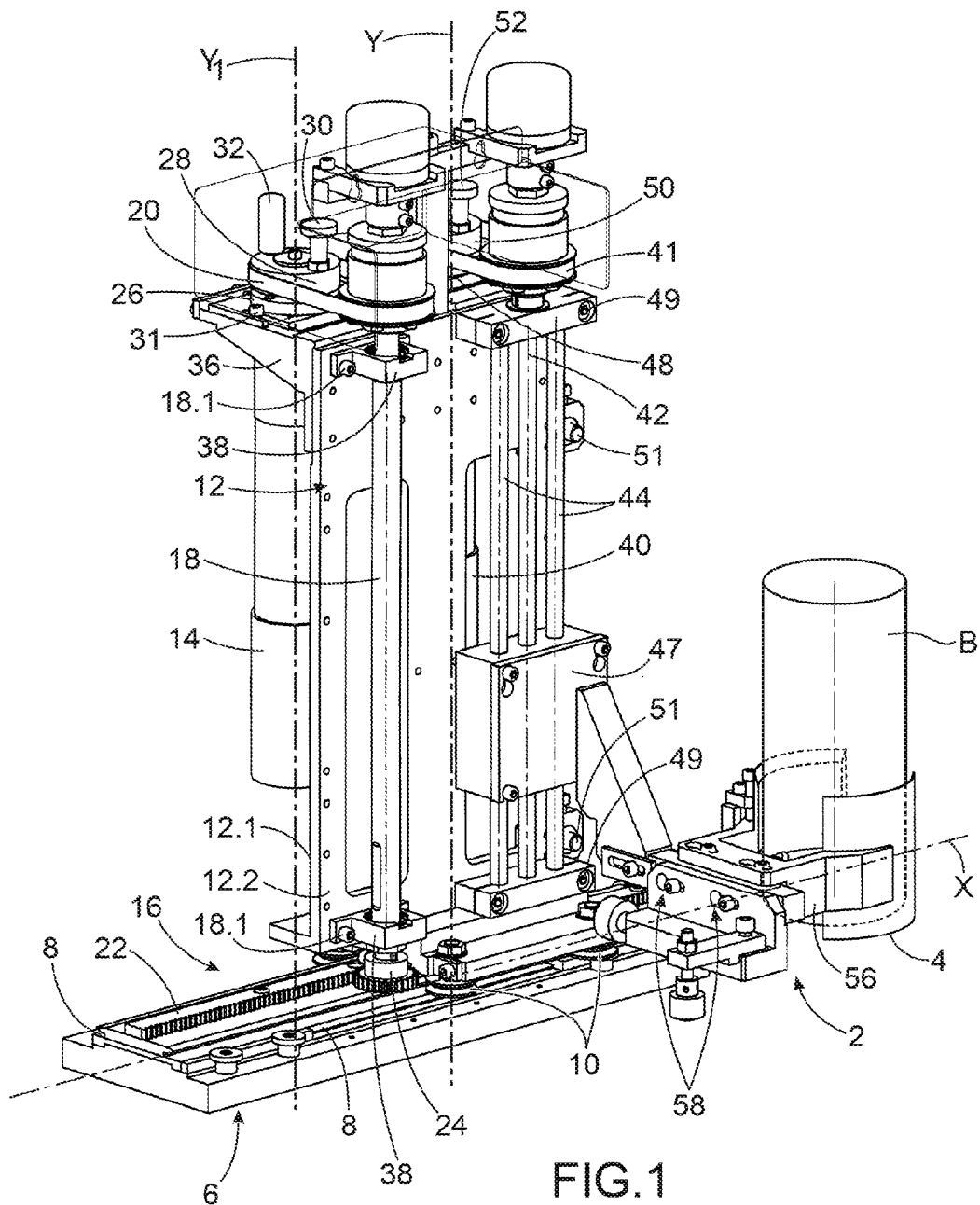
FIG. 1 is a perspective view of an example embodiment of a handling device according to this invention.

FIG. 1 shows a perspective view of an example embodiment of a handling device according to this invention.

This handling device is intended particularly to handle objects in a confined space, such as a glove box in a nuclear fuel fabrication installation. The objects to be placed may for example be boxes full of plutonium oxide for fabrication of MOX fuel pellets. The remainder of the description applies to handling of the plutonium oxide box, but it will be understood that this device can displace any other object.

The handling device in FIG. 1 comprises a carriage 2 provided with a basket 4 inside which a cylindrical box is shown in dashed lines containing plutonium oxide. This box is denoted B.

The handling device comprises a base 6 provided with rails 8 for linear guidance of the carriage 2 along the horizontal axis X. The carriage 2 comprises means of cooperation with the rails 8. Very advantageously, they are guide rollers 10, these rollers having the advantage of being less sensitive to the presence of dust than other systems such as ball pads.

In the example shown, the carriage 2 can be displaced along the X axis and along a Y axis perpendicular to the X axis and in the vertical direction. The scope of this invention includes a handling device providing displacement along the horizontal axis only.

The handling device comprises a vertical chassis 12, and this chassis can be moved horizontally with the carriage.

The handling device comprises means of displacement along the horizontal X axis consisting of a first electric motor 14 for which the Y1 axis is in the vertical direction, a rack-pinion assembly 16, a transmission shaft 18 and a belt 20, the belt 20 assembly and the transmission shaft 18 transmitting the rotation movement from the shaft of the electric motor 14 to the rack-pinion assembly 16. The use of a belt to transmit the drive from the electric motor 14 to the transmission shaft 18 has the advantage that it is a device that is not very sensitive to dust. It also simplifies disassembly and reassembly operations.

Alternately, a chain transmission could be envisaged.

The rack-pinion assembly 16 comprises a rack 22 with X axis fixed to the base 6 and a pinion 24 directly connected to the transmission shaft 18 and engaging with the rack 22.

The first electric motor 14 is fixed to the vertical chassis 12 at the top, the shaft of the electric motor 14 projecting upwards from the device opposite the base 6 supporting the rack-pinion assembly.

Very advantageously, declutching means between the first electric motor 14 and the transmission shaft 18 are provided and manual means are also provided for driving the transmission shaft 18 so that the carriage 2 can be displaced horizontally if there is a failure of the first electric motor.

The declutching means are composed of a drive pulley 26 directly connected to the motor shaft 14 and a declutching pulley 28 which, during normal operation, is driven by the drive pulley 26 through a locking pin 30 passing through the declutching pulley 28 and penetrating into the drive pulley 26. The drive belt 20 is driven in rotation by the declutching pulley 28.

The declutching pulley 28 advantageously also comprises a crank handle 32 projecting vertically upwards from the declutching pulley 28, turning the declutching pulley 28 about its axis in the case of a failure of the electric motor 14, or for any other reasons requiring manual handling of the carriage along the X axis.

The operator applies an upwards force on the locking pin 30 so as to withdraw its end from the drive pulley 26 and disengage the declutching pulley 28 from the drive pulley 26.

The operator then turns the declutching pulley 28 about its axis using the crank handle 32, thus driving the transmission belt 20, the transmission shaft 18 and the pinion 24 that engages with the rack 22. The carriage 2 is thus displaced manually along the X axis. The displacement direction of the carriage 2 depends on the direction of rotation of the declutching pulley 28. This arrangement has the advantage that no piece needs to be removed, preventing the risk that it might fall into the glove box while it is being removed and disturb operation of the device.

It would also be possible to envisage making the transmission shaft turn about itself directly without passing through the declutching pulley and the transmission belt. For example, this could be done by removing the transmission belt, avoiding the need to use a declutching pulley.

However, the work time would be longer.

The first motor 14 is suspended from the vertical chassis 12 by means of a bracket 36 fixed to a face 12.1 of the vertical chassis 12. The motor 14 is held in place on the bracket 36 by screws 31, easily accessible through the top of the device and enabling easy withdrawal of this motor 14.

The transmission shaft is very advantageously fixed through two bearings 38 onto the vertical chassis 12 on a face 12.2 opposite the face 12.1 on which the electric motor 14 is fixed. The bearings are fixed on the vertical chassis by screws 18.1 also easily accessible by an operator through glove ports of the glove box. The first motor 14 is easily removable, as is the transmission shaft 18.

Advantageously and as shown in the example, the handling device also comprises means of displacing the carriage 2 along the vertical axis Y comprising a second electric motor 40 and a ball screw 42 in the example shown. A pulley-belt system driven by a pinion or any other means driven by an electric motor to move the carriage vertically could also be used.

Advantageously as can be seen in FIG. 1, the device comprises two vertical guide columns 44 on each side of the ball screw to guide the carriage 2 vertically.

Very advantageously and in a manner similar to the assembly of the first electric motor 14, the second electric motor 40 is arranged vertically, parallel to the first motor 14, its drive shaft projecting upwards from the handling device and being connected to the ball screw 42 through a belt 41. Manual declutching and control means are also advantageously provided between the second motor 40 and the ball screw 42 to enable manual displacement along the vertical Y direction.

The carriage 2 is fixed to the ball screw by a linear guide table 47 sliding along the guide columns. Other declutching and displacement means could be envisaged, like the manual declutching and displacement means of the carriage along the horizontal direction.

Very advantageously, the ball screw and guide column assembly is fixed laterally on the vertical chassis 12 by means of screws 49 easily accessible to an operator, on the same face as the transmission shaft 18. The second motor 40 is also advantageously fixed onto the chassis suspended from a bracket (not shown) on the same face of the chassis 12 as the first motor 14, the screws fixing the first motor also being accessible from the top of the device.

The declutching means of the second motor 40 consist of a drive pulley 48 directly fixed in rotation to the shaft of motor 40 and a declutching pulley 50 that, during normal operation, is driven by the drive pulley 48 through a locking pin 52 passing through the declutching pulley 50 and penetrating into the drive pulley 48. The drive belt 41 is driven in rotation by the declutching pulley 50. The declutching pulley 50 also comprises a crank handle (not shown) projecting vertically upwards from the declutching pulley 50, to rotate the declutching pulley 50 about its axis.

Since manual displacement of the carriage along the vertical direction is similar to manual displacement along the horizontal direction, no further description of it is necessary.

The arrangement of the first motor and the transmission shaft on each side of the vertical chassis 12 is in no way limitative. For example, it would be possible for the motor 14 and the transmission shaft to be on the same side of the chassis. The arrangement described and shown for the motor 40 and the ball screw is also in no way limitative.

However, the configuration of the device as shown has the advantage of being compact, it balances the loads on each side of the chassis and provides excellent access to the different parts.

We will now describe details of the basket 4 in which the box of plutonium oxide B fits.

FIG. 1 shows that the basket is fixed by means of a clevis 56 on the carriage 2, and by means of keyholes and captive screws 58 facilitating its placement and adjustment of its position.

Figure 2A:
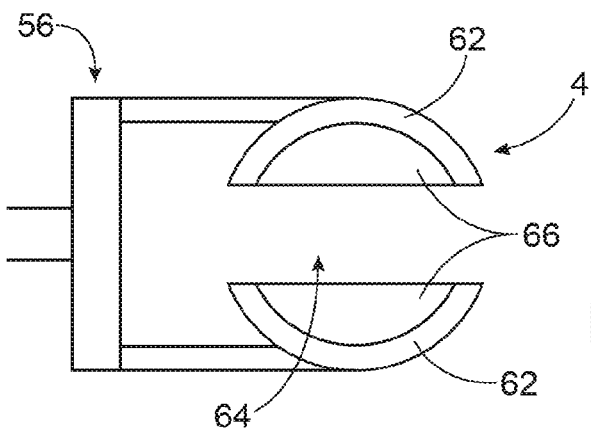
FIGS. 2A and 2B are diagrammatic views of the basket mounted on the carriage in the device in FIG. 1 and an elevating system to put the box into place in the basket respectively.
Figure 2B:
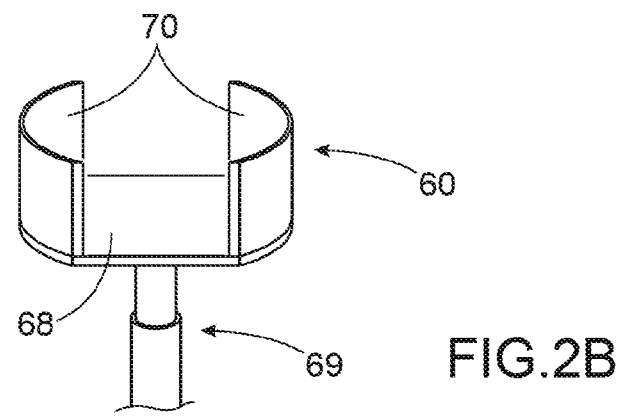
Figure 2C:
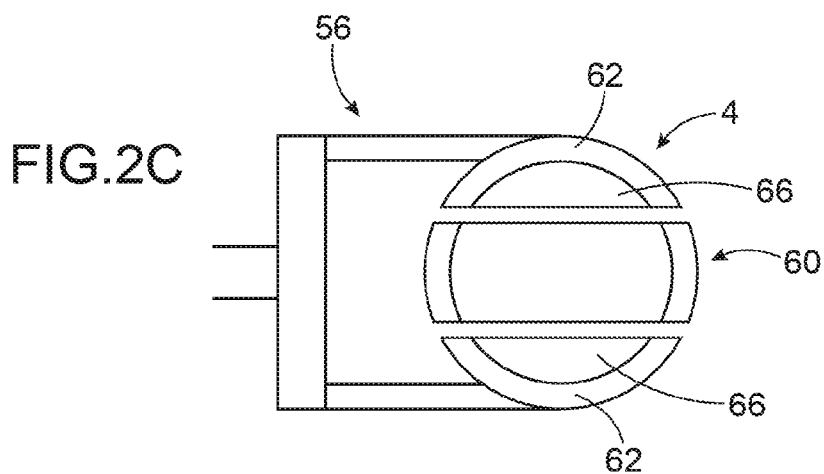
FIG. 2C is a top view of the basket and the elevator in a state in which a box is put into place, the box being shown in dashed lines.

FIGS. 2A and 2C show diagrammatic views of a top view of the basket 4, and FIG. 2B shows a diagrammatic view of a box elevating device 60 for placing the box B in the basket 4 and for removing it.

As can be seen in FIG. 2A, the basket comprises two side walls 62 with a section in the shape of the arc of a circle and a recessed bottom 64, the bottom being formed by two portions 66 fixed to the lower ends of the sidewalls 62 such that the recess in the bottom is approximately rectangular in shape, the portions 66 supporting the side ends of the bottom of the box B. Each of the sidewalls 66 of the basket is fixed onto an arm of the clevis 56 such that the two sidewalls 62 face each other and delimit a circular shaped housing as seen from above with inside dimensions corresponding to the outside dimensions of the box B.

FIG. 2B shows a diagrammatic view of a box elevator 60 enabling placement of the box B in the basket 4 and its removal. The elevator 60 comprises a support 68 and a telescopic shaft 69 with a vertical axis fixed to the support and moving it vertically. The support 68 has an approximately rectangular shape delimited at the two ends by two end walls 70 in the form of an arc of a circle and of low height, the dimensions of which correspond to the recess in the bottom 64 of the basket 4 so that it can be housed in this recess as can be seen diagrammatically in FIG. 2C. The support 68 and the sidewalls 62 delimit a space with inside dimensions corresponding to the outside dimensions of the box B, and particularly the diameter of the bottom of the box B.

We will now explain a step to place the box B in the basket using an elevator 60. The box B is loaded on the support 68 of the elevator 60. The shaft 69 of the elevator is extended such that the support containing the box B moves into a sufficiently high position and such that the two sidewalls 62 of the basket 4 can be located on each side of the telescopic shaft 69 of the elevator. The basket moves towards the shaft such that the two sidewalls 62 of the basket are located on each side of the telescopic shaft 69. In this position, the box B is located above the basket and the shaft 69 passes through the hollowed-out bottom of the basket. Finally, the elevator is lowered, which has the effect of placing the box B between the sidewalls and on the bottom of the basket 4. In continuing its lowering, the elevator is released from the box that is fully supported on the bottom of the basket.

Alternatively, it could be imagined that the basket supported by the carriage moves vertically upwards to support the box and move it away from the elevator support. The basket and the elevator make it very simple to transfer the box B without requiring any important settings, and preventing any interaction between the elevator and the baskets that might be prejudicial to correct operation of the device.

The shape of the basket is in no way limitative. It would also be possible to handle several objects at the same time. For example, the box could be square in section or it could have an elliptical section, and in this case the basket would then be adapted to this shape.

The handling device is advantageously fitted with sensors to detect the vertical and horizontal positions of the carriage; these sensors for vertical displacement of the carriage may for example be inductive, they are marked as reference 51 in FIG. 1 and are fixed onto the vertical chassis 12 on the same side as the guide columns. An operator can then easily access these sensors and replace them in case of a failure.

Therefore, the handling device according to this invention facilitates maintenance in case of a failure of any of its elements because its structure makes all these elements, or in any case all elements likely to fail, easily accessible and easily removable with a single hand by an operator acting outside a glove box using gloves fixed onto the glove ports. It also enables manual displacement along the horizontal axis and along the vertical axis of the carriage, returning the carriage to the rest position to terminate a step and thus avoiding interruption of a step currently being executed.

This handling device can be used in any type of installation requiring manipulation in confined locations with difficult access and for which maintenance may be problematic and tedious.

The invention claimed is:

1. Device for handling objects in a glove box comprising a carriage to support the objects to be handled, a base relative to which the carriage can be moved along a first axis, a chassis that can also be moved along the first axis, means of driving the carriage along the first axis, said drive means comprising a first electric motor fixed to the chassis, said first electric motor comprising a drive shaft which is orthogonal to the first axis and projects opposite from the base, a transmission shaft fixed to the chassis parallel to the first motor, a first transmitter for transmitting rotation of the drive shaft to the transmission shaft, a rack fixed onto the base along the first axis and a pinion fixed in rotation to the transmission shaft and engaging with the rack, the drive means along the first axis also comprising first declutching means between the first electric motor and the transmission shaft and the drive means along the first axis also comprising a first manual controller to enable displacement of the carriage along the first axis without using the first electric motor.

2. Handling device according to claim 1, in which the first transmitter is a transmission belt.

3. Handling device according to claim 2, in which the declutching means comprise a first declutching pulley and retractable means for fixing the first declutching pulley in rotation with a first drive pulley fixed in rotation to the drive shaft of the first electric motor, the belt connecting the first declutching pulley and the transmission shaft, said first declutching pulley including a crank handle to drive it in rotation when it is no longer fixed to the first drive pulley.

4. Handling device according to claim 1, in which the carriage can be displaced along a second axis and in which said device comprises displacement means for displacing the carriage along the second axis, said displacement means comprising a second electric motor fixed onto the chassis, said second electric motor comprising a drive shaft which is orthogonal to the first axis and projects opposite the base, conversion means for converting rotation of the second electric motor into a translation movement of the carriage along the second axis, a second transmitter for transmitting rotation of the drive shaft from the second electric motor to the conversion means, said displacement means along the second axis also comprising second declutching means between the second electric motor and the conversion means and said displacement means along the second axis also comprising a second manual controller of said conversion means.

5. Handling device according to claim 4, in which the conversion means consist of a ball screw.

6. Handling device according to claim 4, in which the second transmitter is a transmission belt.

7. Handling device according to claim 6, in which the declutching means comprise a second declutching pulley and retractable means to fix the second declutching pulley in rotation to a second drive pulley fixed in rotation to the drive shaft of the second electric motor, the belt connecting the second declutching pulley and the ball screw, said second declutching pulley comprising a crank handle to rotate it when it is no longer fixed to the second drive pulley.

8. Handling device according to claim 4, comprising at least one column to guide displacement of the carriage along the second axis.

9. Handling device according to claim 4, in which the first axis is horizontal and the second axis is vertical.

10. Handling device according to claim 4, in which the second electric motor is suspended from a bracket fixed on a side face of the chassis.

11. Handling device according to claim 4, in which the transmission shaft is mounted by means of two bearings on one side face of the chassis opposite a face from which the first electric motor is suspended, said bearings being fixed removably on the chassis and in which the second electric motor is suspended from a bracket fixed on a side face of the chassis and in which the conversion means and the guide columns are mounted on the same side face of the chassis as the side face on which the transmission shaft is mounted.

12. Handling device according to claim 1, in which the base comprises guide rails along the first axis, the carriage comprising guide rollers cooperating with said rails.

13. Handling device according to claim 1, in which the chassis has a flat shape and the chassis is oriented vertically and in which the first electric motor is suspended from a bracket fixed onto a side face of the chassis.

14. Handling device according to claim 13, in which the transmission shaft is mounted by means of two bearings on one side face of the chassis opposite the face from which the first electric motor is suspended, said bearings being fixed removably on the chassis.

15. Handling device according to claim 1, in which the carriage comprises at least one basket in which a box will be placed, said basket comprising two sidewalls facing each other and delimiting a housing suitable to contain the box, said housing comprising at least one lateral opening and a bottom in which a recess is formed, each of the sidewalls comprising a horizontal support that will support the box vertically.

16. Handling device according to claim 15, in which the box is cylindrical with a circular cross-section and in which the sidewalls have a section in the form of an arc of a circle so as to delimit a housing with an inside diameter corresponding to an outside diameter of the box.

17. Handling device according to claim 15, comprising an elevator designed to put the box into place in the basket, the elevator comprising a telescopic shaft along a vertical direction and a support fixed to the shaft with a shape complementary to the shape of a recess in the bottom of the basket.

* * * * *